(12) United States Patent
Imai et al.

(10) Patent No.: US 6,647,331 B2
(45) Date of Patent: Nov. 11, 2003

(54) COLLISION SEVERITY DETERMINING SYSTEM

(75) Inventors: Katsuji Imai, Nagoya (JP); Yujiro Miyata, Toyota (JP); Motomi Iyoda, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/140,295

(22) Filed: May 8, 2002

(65) Prior Publication Data

US 2002/0169535 A1 Nov. 14, 2002

(30) Foreign Application Priority Data

May 14, 2001 (JP) ........................ 2001-143669

(51) Int. Cl.⁷ ............................................. B60R 21/32
(52) U.S. Cl. ........................................................ 701/45
(58) Field of Search ................................ 701/36, 45–46; 180/271, 282; 280/727, 728.1, 730.1, 730.2, 735; 340/467

(56) References Cited

U.S. PATENT DOCUMENTS

| 5,498,028 | A |   | 3/1996 | Carlin et al. |   |
|-----------|---|---|--------|---------------|---|
| 6,070,113 | A |   | 5/2000 | White et al.  |   |
| 6,186,539 | B1 | * | 2/2001 | Foo et al. ................. | 280/735 |

FOREIGN PATENT DOCUMENTS

| EP |   | 0 982 199 A1 |   | 3/2000 |   |
|----|---|--------------|---|--------|---|
| JP | (A) | HEI 10-152014 |   | 6/1998 |   |
| JP | (A) | HEI 11-170964 |   | 6/1999 |   |
| JP |   | 11-170964 | * | 6/1999 | ........... B60R/21/32 |
| JP | (A) | HEI 2002-104130 |   | 4/2002 |   |
| WO |   | WO 02/12029 A1 |   | 2/2002 |   |

OTHER PUBLICATIONS

European Search Report Application No. EP 02 01 0665 dated Oct. 30, 2002.

* cited by examiner

*Primary Examiner*—Thu Nguyen
(74) *Attorney, Agent, or Firm*—Kenyon & Kenyon

(57) ABSTRACT

A collision severity determining system for determining severity of a collision of a vehicle includes a first deceleration detector disposed in a central portion of a vehicle for detecting a deceleration in a longitudinal direction of the vehicle, and a second deceleration detector disposed in a front portion of the vehicle for detecting a deceleration in the longitudinal direction. A controller calculates a velocity change amount of the vehicle by integrating the vehicle deceleration with respect to time, and determines severity of the collision by comparing the vehicle deceleration with a threshold value corresponding to the same velocity change amount. When a problem, such as a failure or breakdown of the second deceleration detector, occurs, the severity determining unit operates in a predetermined fail-safe mode for selecting an appropriate severity determination map stored in the controller, and makes a severity determination based on the selected severity determination map.

9 Claims, 6 Drawing Sheets

FIG. 6
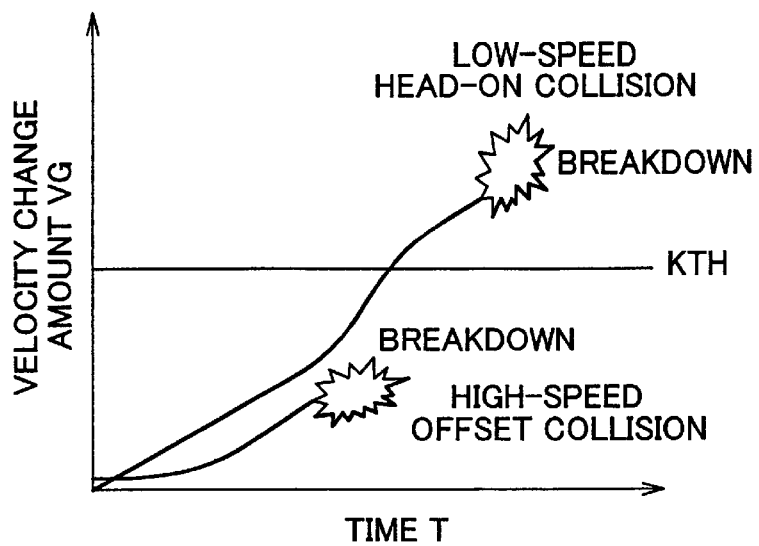
FIG. 7
|  | FAIL-SAFE UPON COLLISION | FAIL-SAFE UPON FAILURE |
|---|---|---|
| VG-SMALL | Low Map | Low Map |
| VG-LARGE | High Map | |
FIG. 8
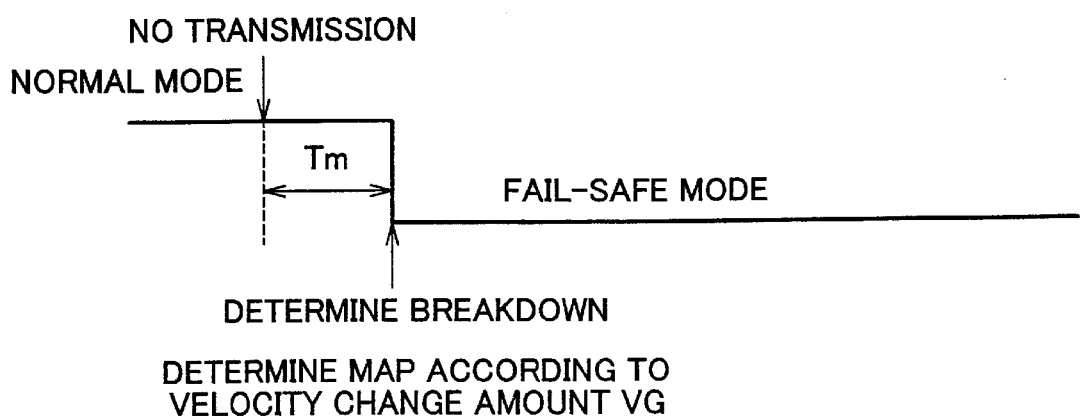

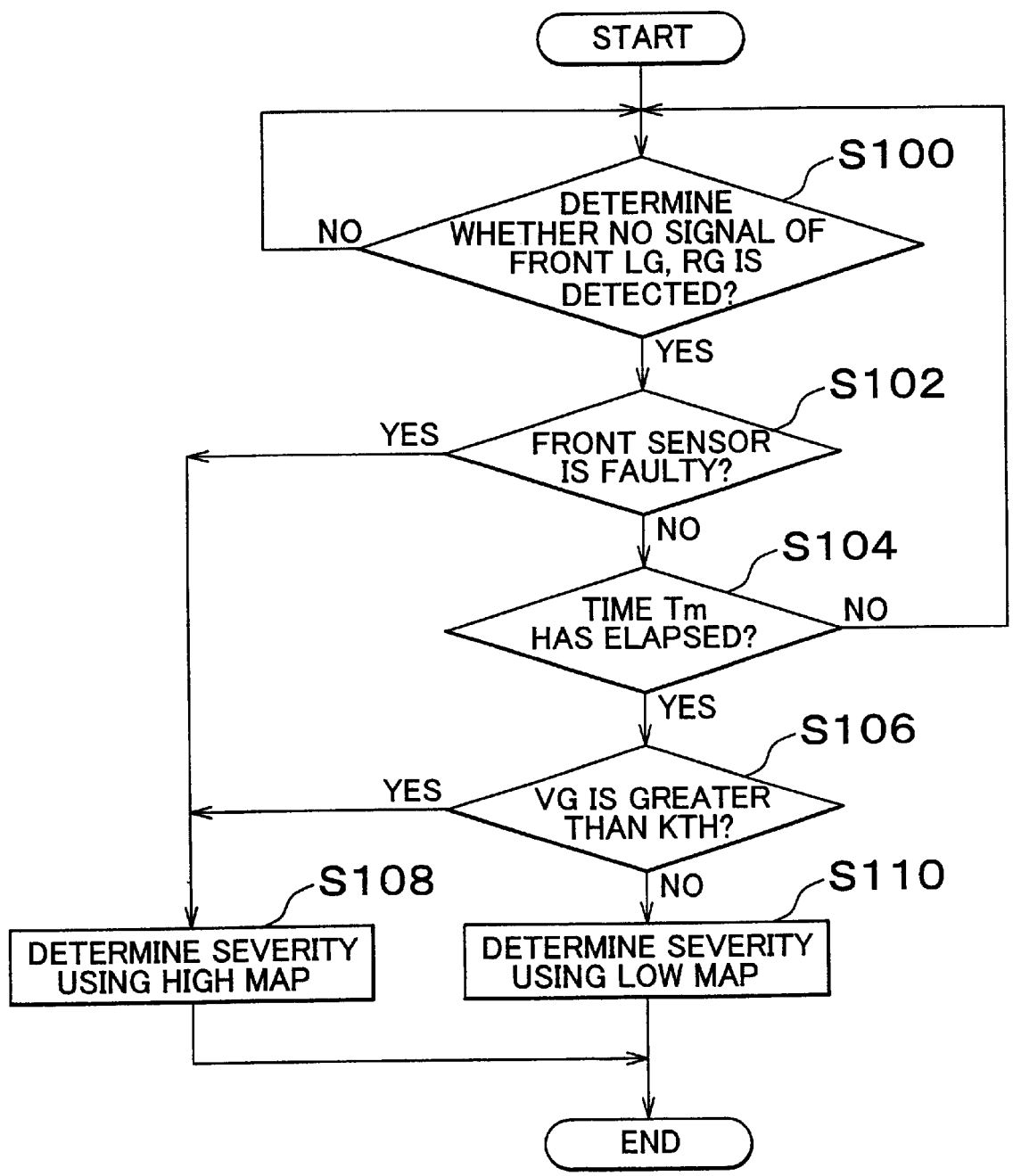

COLLISION SEVERITY DETERMINING SYSTEM

The disclosure of Japanese Patent Application No. 2001-143669 filed on May 14, 2002 including the specification, drawings and abstract is incorporated herein by reference in its entirety.

BACKGROUND OF THE INVENTION

1. Field of the Invention

The invention relates to a collision severity determining system that operates at the time of activation of an occupant protection device, and provides a result of severity determination which can be used for adjusting, for example, the power level of deployment of the occupant protection device, such as an airbag system, thus assuring more appropriate occupant protection.

2. Description of Related Art

Occupant protection devices, such as airbag systems, which are installed on vehicles are known in the art. The timing of activation of such an occupant protection device is adjusted based on changes in the deceleration of the vehicle with time, which is detected by a deceleration sensor, or the like, incorporated in the vehicle. In order to activate the occupant protection device at a more appropriate time, it is important to detect collision of the vehicle with sufficiently high reliability. As one type of a device for detecting collision of the vehicle, Japanese Laid-Open Patent Publication No.10-152014 discloses an activation control system which includes a floor sensor disposed substantially at the center of a vehicle chassis and a front sensor or sensors disposed in a front portion of the vehicle. The control system controls activation of an occupant protection device based on decelerations detected by the floor sensor and the front sensor(s). With such an activation control system, the occupant protection device can be appropriately activated by referring to a deceleration(s) detected by the front sensor(s), even when it is difficult to detect an impact only by means of the floor sensor.

For achieving further reliable occupant protection at the time of a collision of the vehicle, it is preferable to determine severity of the collision, namely, a degree of the vehicle collision that causes a secondary collision of the occupant against an object within the passenger compartment, and adjust the level of the power for activating the occupant protection device in accordance with the collision severity. The severity determination can be made based on a deceleration detected by the floor sensor while referring to a deceleration(s) detected by the front sensor(s) as in the case where the activation of the occupant protection device is detected.

In the meantime, the vehicle is provided with a predetermined failsafe mode, so as to ensure appropriate occupant protection even when any problem occurs to the vehicle. For example, an ECU (electronic control unit) provided at a predetermined position in the vehicle monitors vehicle conditions, including those of an engine and a brake system, at regular intervals. Upon occurrence of any problem to the vehicle, the vehicle generates a certain warning or alarm, and starts operating in a predetermined fail-safe mode designed for securing the safety of the vehicle occupant.

The vehicle operates in the above-described fail-safe mode in various situations, which includes the case where a problem occurs to the front sensor or sensors. In the case of a vehicle equipped with an occupant protection device capable of determining the collision severity, results of severity determination obtained with the same output value of the floor sensor may differ depending upon the deceleration(s) detected by the front sensor(s). In view of this case, it has been proposed to program the occupant protection device in advance to use a lower threshold value than in normal cases, for determining the collision severity in the failsafe mode.

Examples of problems that can occur to the front sensor include, for example, a failure of the front sensor during normal use, which is an extremely rare occasion, breakdown of the front sensor itself due to a collision of the vehicle, disconnection of a communication line or lines around the front sensor upon a vehicle collision, and so forth. The problems arising from these different causes make it impossible to detect a deceleration from the front sensor for use in severity determination.

To ensure sufficiently high occupant protection reliability, it is preferable to determine the severity of a collision in an appropriate manner, depending upon the cause of the problem that occurs to the front sensor. As described above, the occupant protection device may be pre-programmed to use a lower threshold value upon occurrence of a problem to the front sensor, for determining the collision severity in the fail-safe mode. However, it would be more desirable to determine the collision severity depending upon the cause of the problem occurring to the front sensor, in order to achieve more appropriate occupant protection.

SUMMARY OF THE INVENTION

It is therefore an object of the invention to provide a severity determining system that is able to determine severity of a collision with improved accuracy even when a problem occurs to a front sensor or sensors.

To accomplish the above and/or other object(s), there is provided according to one aspect of the invention a collision severity determining system for determining severity of a collision of a vehicle, which system includes: (a) a first deceleration detector disposed substantially in a central portion of a body of the vehicle so as to detect a vehicle deceleration in a longitudinal direction of the vehicle, (b) a second deceleration detector disposed in a front portion of the vehicle that is located ahead of the first deceleration detector, so as to detect a deceleration at the front portion in the longitudinal direction of the vehicle, (c) a velocity change amount calculating unit that calculates a velocity change amount of the vehicle by integrating the vehicle deceleration detected by the first deceleration detector with respect to time, (d) a severity determining unit storing two or more severity determination maps defined by the vehicle deceleration detected by the first deceleration detector and the velocity change amount, each of the severity determination maps representing a threshold pattern consisting of threshold values with which the vehicle deceleration is compared so as to determine severity of the collision of the vehicle, and (e) a problem detecting unit that generates a problem detection signal that indicates that a problem has occurred to the vehicle, when detecting an absence of a signal indicative of the deceleration transmitted from the second deceleration detector. In the severity determining system, when the severity determining unit receives the problem detection signal from the problem detecting unit, the determining unit operates in a predetermined fail-safe mode for selecting an appropriate one of the two or more severity determination maps, and determines severity of the collision of the vehicle, based on the selected severity determination map.

With the collision severity determining system constructed as described above, the problem detecting unit detects an abnormality in transmission of a signal indicative of the deceleration from the second deceleration detector, and the severity determining unit operates in the fail-safe mode to determine severity of the vehicle collision. In this manner, the collision severity can be determined in a desirable manner even when a problem has occurred to the second deceleration detector.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 6 is a graph showing relationships between time T as measured from the beginning of a collision and a velocity change amount VG;

FIG. 7 is a table summarizing selection of low and high maps in a fail-safe mode;

FIG. 8 is a view showing a shift of an operating mode of the severity determining system from a normal mode to a fail-safe mode; and FIG. 9 is a view showing a control routine executed by the severity determining system of one exemplary embodiment for making a severity determination in the fail-safe mode.

DETAILED DESCRIPTION OF PREFERRED EMBODIMENTS

Figure 1:
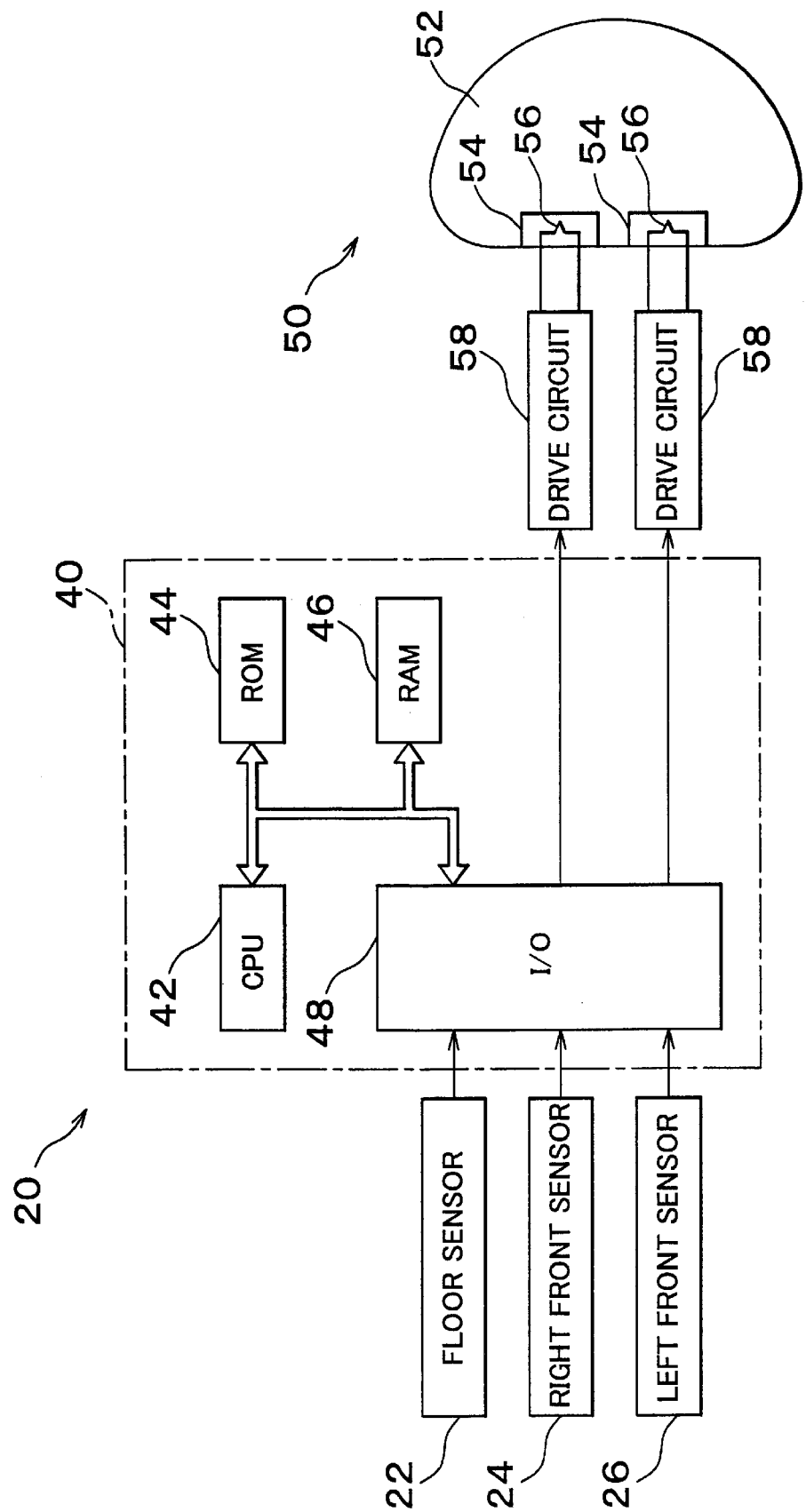
FIG. 1 is a view showing a hardware configuration of a severity determining system according to one exemplary embodiment of the invention, used with an occupant protection device.

FIG. 1 schematically illustrates a hardware configuration of a collision severity determining system 20 according to one exemplary embodiment of the invention when it is used with an occupant protection device. In FIG. 1, an airbag device 50 is illustrated as a typical example of the occupant protection device. According to this embodiment of the invention, an airbag 52 stored in the airbag device 50 is adapted to deploy at a high power level or at a low power level according to a result of determination (i.e., the severity of a collision) obtained by the severity determining system 20.

In addition to the severity determining system 20 of the embodiment, there is provided an activation device (not shown) that determines whether the airbag device 50 should be activated. If the activation device determines the airbag device 50 should be activated, the airbag is activated to deploy at a high or low power level according to the collusion severity determined by the severity determining system 20 as described above.

Figure 2:
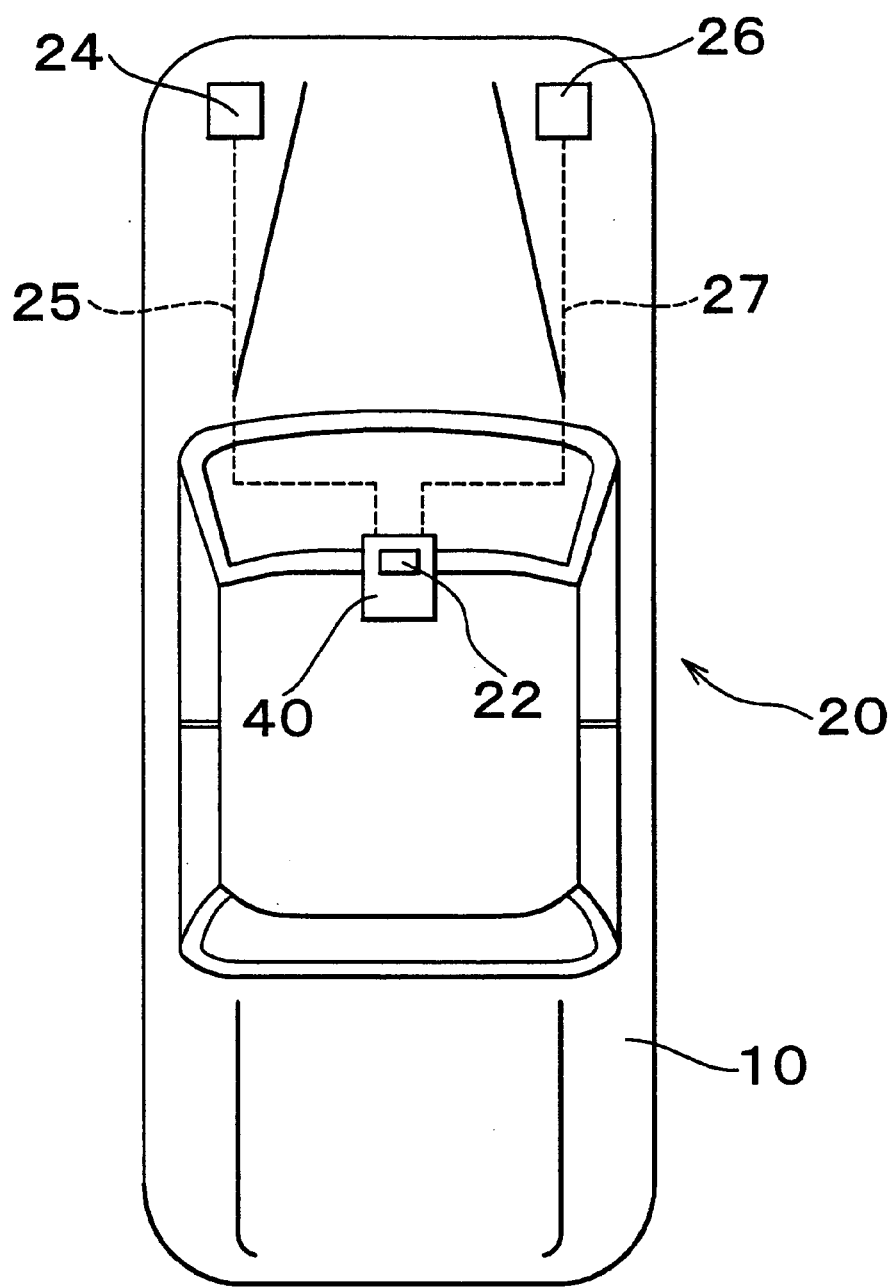
FIG. 2 is a view showing a motor vehicle in which the severity determining system shown in FIG. 1 is installed.
Figure 3:
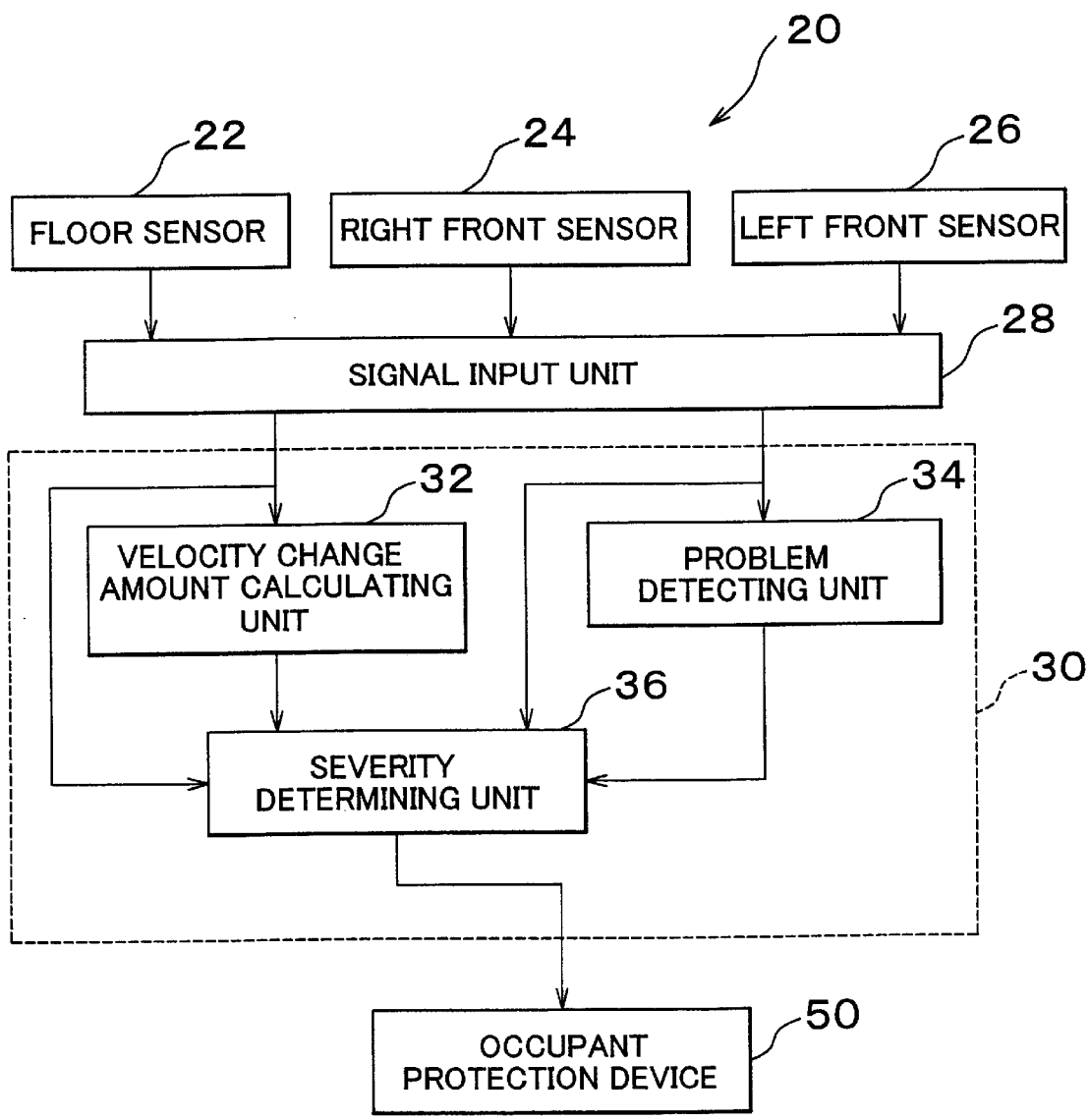
FIG. 3 is a functional block diagram schematically showing the configuration of the severity determining system shown in FIG. 1.

FIG. 2 illustrates the severity determining system 20 when it is installed on a motor vehicle 10. FIG. 3 is a block diagram schematically illustrating a functional arrangement of the severity determining system 20.

As shown in FIG. 1 and FIG. 2, the severity determining system 20 of the embodiment includes a floor sensor 22 disposed in the vicinity of a console box mounted in a central portion of the vehicle 10, and a left front sensor 24 and a right front sensor 26 mounted on front portions of respective side members of the vehicle 10. The floor sensor 22 serves to detect a vehicle deceleration (hereinafter referred to as "floor G"), and the left and right front sensors 24, 26 serve to detect vehicle decelerations (hereinafter referred to as "front LG" and "front RG") in the longitudinal direction (i.e., the running direction) of the vehicle 10. Here, instead of those front sensors 24 and 26, one front sensor may be disposed at the center of the front portion of the vehicle 10.

The severity determining system 20 of the embodiment has a predetermined fail-safe mode in which collision severity is determined when the left front sensor 24 or the right front sensor 26, in particular, has any problem, such as a failure or breakdown of the sensor. When the left and right front sensors 24, 26 operate normally, on the other hand, the severity determining system 20 determines collision severity in a normal mode, as described later.

Referring first to FIG. 1, the construction of the severity determining system 20 will be described in detail. The severity determining system 20 of the embodiment includes a microcomputer 40, which has a function of determining the severity of a collision of a vehicle based on the floor G detected by the floor sensor 22 and the front LG and RG detected by the front sensors 24 and 26. The microcomputer 40 includes a CPU 42 as its central component, and further includes a ROM 44 storing operation programs, a RAM 46 capable of temporarily storing data, and an input/output (I/O) circuit 48.

For example, the CPU 42 is arranged to start sampling of a signal from the floor sensor 22 at a predetermined frequency (e.g., 2 kHz) after the floor sensor 22 detects a predetermined value of the floor G. Then, when at least one of the front LG and RG, detected by the front sensors 24 and 26, becomes greater than a predetermined threshold value, the microcomputer 40 senses a possibility of a vehicle collision, and proceeds to perform a predetermined control operation. Furthermore, the microcomputer 40 determines whether a vehicle collision is occurring (i.e., the vehicle is in collision with an object) based on the front LG and RG detected by the front sensors 24 and 26, and determines the collision severity based on the floor G detected by the floor sensor 22 while referring to the detected front LG and RG. A functional arrangement of the microcomputer 40 will be apparent from the functional block diagram of FIG. 3 showing the severity determining system 20.

Next, an operation of the severity determining system 20 will hereinafter be described with reference to the functional block diagram of FIG. 3. As shown in FIG. 3, a determining unit 30 of the system 20 receives, via a signal input unit 28, a signal indicative of the floor G detected by the floor sensor 22 and signals indicative of the front LG and RG detected by the front sensors 24 and 26, at a predetermined sampling frequency.

When at least one of the front LG and RG detected by the front sensors 24, 26 becomes greater than the predetermined threshold value, the determining unit 30 assumes a vehicle collision and starts a preparatory operation for severity determination. The determination unit 30 includes a velocity change amount calculating unit 32 for calculating a velocity change amount VG which is obtained by integrating the floor G with respect to time, and a severity determining unit 36 that determines collision severity according to the floor G and velocity change amount VG in the event of a collision. The velocity change amount calculating unit 32 calculates the velocity change amount VG associated with the floor G, according to an expression (1) shown below. By integrating the floor G to obtain the velocity change amount VG, noises can be removed, thus permitting more desirable severity determination.

$$VG = \int G(t)dt \qquad (1)$$

Figure 4:
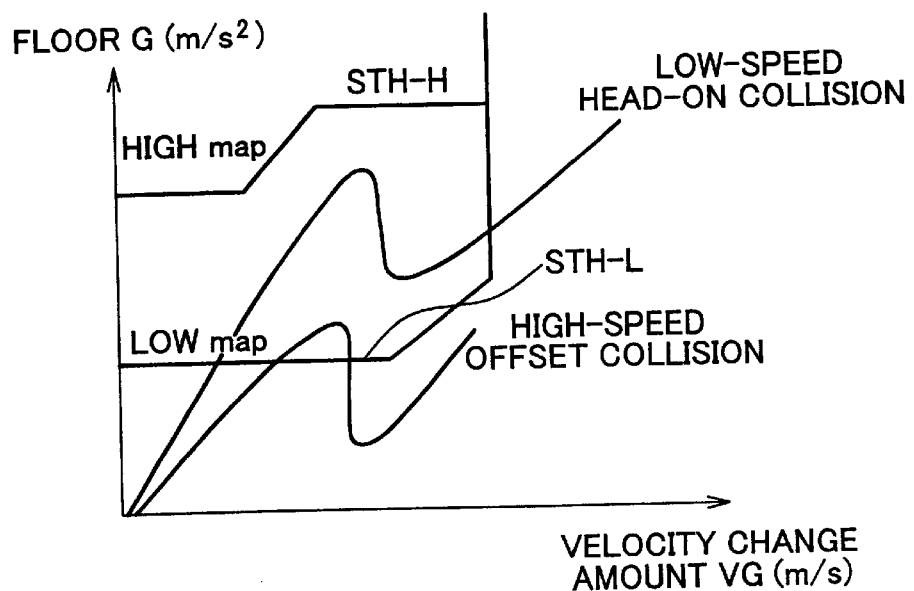
FIG. 4 is a graph showing examples of severity determination maps stored in a severity determining unit of the system of FIG. 3.

The severity determining unit 36 incorporates a severity determination map as shown in FIG. 4, in which the vertical axis represents the floor G and the horizontal axis represents the velocity change amount VG. Using this severity determination map, the severity determining unit 36 determines collision severity based on the floor G detected by the floor sensor 22. Then, the power level of the airbag device 50 for inflating the airbag 52 is determined based on the result of severity determination.

The severity determination map as shown in FIG. 4 includes two different threshold patterns STH-H and STH-L which will be explained below. Each threshold pattern STH-H, STH-L represents thresholds or reference values for determining whether the collision severity is at a high level or at a low level. Namely, the severity is determined as being at a high level (i.e., high severity) if a point determined by the floor G and the velocity change amount VG is located above the selected threshold pattern, and is determined as being at a low level (i.e., low severity) if a point determined by the floor G and the velocity change amount VG is located below the selected threshold pattern. Thus, even with substantially the same value of the floor G detected upon collisions, the severity may be determined as HIGH, which requires the airbag 52 to deploy at a high power level, or may be determined as LOW, which requires the airbag 52 to deploy at a low power level, depending upon the mode of the vehicle collision.

Thus, the severity determination map used in the embodiment includes a HIGH map in which the threshold values STH are set relatively high (pattern STH-H), and a LOW map in which the threshold values STH are set relatively low (pattern STH-L). When the vehicle undergoes an offset collision, or the like, at a high speed, which normally causes a great impact to the occupant, it is preferable that the collision severity be likely to be determined as being HIGH even with a relatively small floor G, and therefore the LOW map is used for the severity determination. Conversely, when the vehicle undergoes a head-on collision, or the like, at a low speed, which normally causes a relatively small impact to the occupant, it is preferable that the collision severity be likely to be determined as being LOW, and therefore the HIGH map is used for the severity determination.

The determination as to whether the LOW map or HIGH map is used is made according to the mode of the vehicle collision, referring to the front LG and RG detected by the front sensors 24, 26. The threshold pattern STH-H in the HIGH map and the threshold pattern STH-L in the LOW map are respectively predetermined for each vehicle model, based on data obtained in collision tests, virtual simulations, and the like.

If the front LG, RG are normally detected by the front sensors 24, 26 and signals indicative of the front LG, RG are normally transmitted to the severity determining system 20, the collision severity can be determined with reference to the detected front LG, RG. In some cases, however, the detection signals are not transmitted from the front sensors 24, 26 because of a certain problem or abnormality. Hence, the severity determining system 20 of the embodiment has a function of performing severity determination even in the case where no detection signal is transmitted from the front sensors 24, 26.

In view of the above situation, the determining unit 30 of the severity determining system 20 includes a problem detecting unit 34. The problem detecting unit 34 monitors the front LG and RG transmitted from the front sensors 24 and 26 at certain intervals, and determines occurrence of a problem when no signal indicative of the front LG and RG is detected. Here, the "problem" is to be interpreted to include, for example, the cases where the front sensor(s) 24, 26 fails during normal use, which is an extremely rare occasion, where the front sensor(s) 24 and 26 is/are broken down due to a collision of the vehicle, and where a communication cable or cables leading to the signal input unit 28 is/are disconnected. The problem detecting unit 34 recognizes the type of the problem as described above, and sends a problem detection signal that includes the type of the problem thus recognized, to the severity determining unit 36.

A predetermined fail-safe mode is set in advance in the severity determining unit 36, and is implemented when the unit 36 receives a problem detection signal from the problem detecting unit 34. In the fail-safe mode, the severity determination is made depending upon the type of the problem of the front sensor(s) 24, 26 included in the problem detection signal from the problem detecting unit 34. In a fail-safe operation performed when the front sensor(s) 24, 26 is/are faulty, the LOW map as shown in FIG. 4 is used for determining the collision severity. In a fail-safe operation performed in the cases where the front sensor(s) 24, 26 is/are broken down due to a collision of the vehicle and where a communication cable connected to the signal input unit 28 is cut off (which cases will be generally referred to as "breakdown of the front sensor(s) 24, 26"), the severity determining unit 36 selects one of the LOW map and the HIGH map, based on the velocity change amount VG measured a predetermined time Tm after no signal indicative of the front LG and RG is detected, and determine the collision severity with reference to the selected map.

Hereinafter, the manner of selecting the LOW map or the HIGH map in the above-described fail-safe mode implemented depending upon the type of the problem will be described.

A failure of the front sensor(s) 24, 26, which is an extremely rare case, can be recognized or confirmed by the problem detecting unit 34 which regularly monitors output signals from the front sensors 24 and 26. When a failure of the front sensor(s) 24, 26 is detected, a certain warning may be given to the occupant by means of an alert lamp or the like so that the occupant will have the vehicle repaired immediately, thus eliminating the problem of the failure of the front sensor(s) 24, 26. However, there is a possibility that the vehicle runs into a traffic accident before the front sensors 24, 26 are repaired. In this case, it is desirable to set the severity determination mode so that the airbag system 50 can deal with a high-speed collision, or the like, that causes a great impact to the occupant.

In the present embodiment, therefore, when the problem arises from a failure of the front sensor(s) 24, 26, the severity determining unit 36 selects the LOW map for determining the collision severity.

Figure 5:
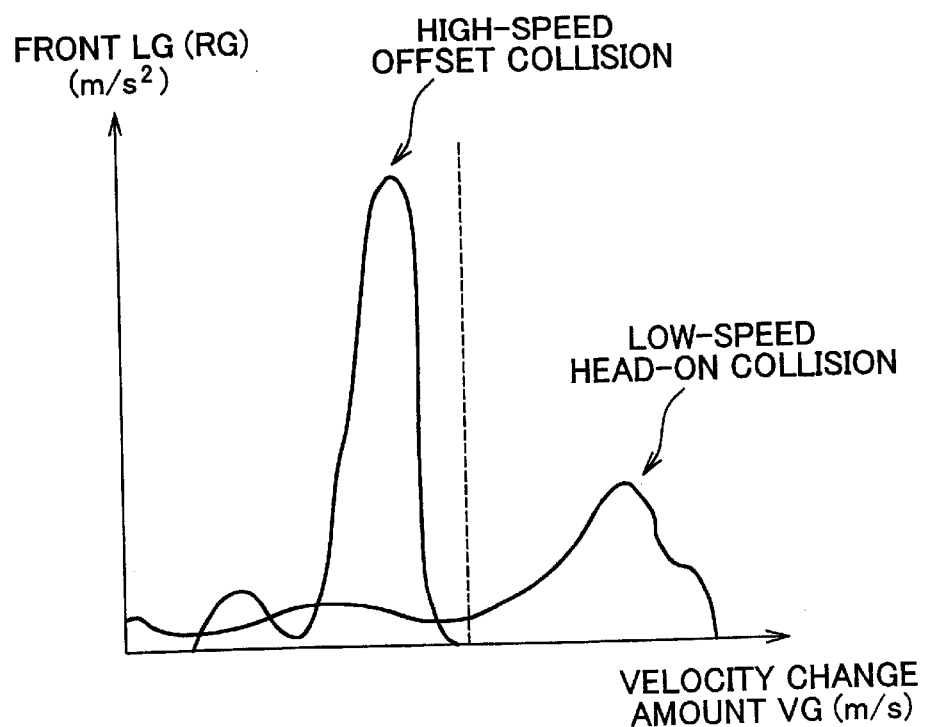
FIG. 5 is a graph showing data obtained from a vehicle at the time of different types of collisions thereof.

In the case where the front sensor(s) 24, 26, or the like, is broken down due to a collision of the vehicle, an intensity of impact to the occupant varies depending on a collision mode. In the graph of FIG. 5, the vertical axis represents the front LG (or RG) (m/S2) detected by the front sensor 24 (or 26) and the horizontal axis represents the velocity change amount VG (n/s) obtained by integrating the floor G with respect to time. FIG. 5 shows data detected in the case (high-speed OBD) where the vehicle undergoes a high-speed offset collision with a relatively soft obstacle, and the case where the vehicle undergoes a low-speed head-on collision. In the case of the high-speed offset collision, the front LG (or RG) reaches a peak when the velocity change amount VG is still small. Thus, the high-speed offset collision is one of collision modes in which a large impact tends to be applied to the occupant, and therefore the severity determination is made using the LOW map so that the severity is more likely to be determined as being HIGH.

In the case of the low-speed head-on collision, on the other hand, the front LG (or RG) gradually changes as the velocity change amount VG increases, and assumes a relatively high value at its peak in the later stage of the collision, though the peak value is still much lower than that of the high-speed offset collision. The low-speed head-on collision represented in the graph is one of collision modes in which a small impact tends to be applied to the occupant, and therefore the severity determination is made using the HIGH map so that the severity is more likely to be determined as being LOW.

A broken line in FIG. 5 represents a boundary line based on which one of the HIGH map and the LOW map is selected. Namely, a collision that shows a relatively high front LG (or RG) in the initial stage of the collision (on the left-hand side of the boundary line) may be determined as a collision mode in which the severity determination is made using the LOW map so that the severity is more likely to be determined as being HIGH. To the contrary, a collision that shows a relatively high front LG (or RG) in the later stage of the collision (on the right-hand side of the boundary line) may be determined as a collision mode in which the severity determination is made using the HIGH map so that the severity is more likely to be determined as being LOW.

The above-described breakdown of the front sensor(s) 24, 26 or its peripheral wiring due to a vehicle collision is supposed to occur when the front LG (RG) reaches its peak. The graph in FIG. 6 shows a relationship between time T measured from a point of time when the vehicle collides with an object, and the velocity change amount VG. As shown in the graph, in the case of the high-speed offset collision, the front sensor 24, 26 or the like tends to break down (become inoperative) before the velocity change amount VG increases to a certain level. In this case, therefore, the detected velocity change amount VG is kept at a relatively low value. In the case of the low-speed head-on collision, on the other hand, the front sensor 24, 26 or the like tends to break down after the velocity change amount VG exceeds a certain level. In this case, the detected velocity change amount VG has a higher value than that in the case of the high-speed offset collision.

In view of the above tendencies, a certain reference value KTH is set between the low value and the high value of the velocity change amount VG as described above. If the detected velocity change amount VG is larger than the reference value KTH, the collision in question is determined as one of collision modes in which the severity determination is made using the HIGH map so that the severity is more likely to be determined as being LOW. If the detected velocity change amount VG does not exceed the reference value KTH, on the other hand, the collision in question is determined as one of collision modes in which the severity determination is made using the LOW map so that the severity is more likely to be determined as being HIGH.

The table of FIG. 7 summarizes selection of the HIGH map or the LOW map by the severity determining unit 36 in the fail-safe mode.

In order to achieve desired occupant protection, much care is desirably taken to determine whether the severity determining unit 36 is brought into the fail-safe mode that is implemented when the front sensor 24, 26, or the like, breaks down due to a collision.

For example, the fail-safe mode may be established by mistake when the transmission of the front LG or RG is interrupted due to noise on communication lines, or other factors. In the embodiment of the invention, therefore, the problem detecting unit 34 does not immediately transmit a problem detection signal indicating breakdown of the front sensor 24, 26, or the like, to the severity determining unit 36, when no signal indicative of the front LG, RG is transmitted from the front sensors 24, 26 in a normal mode, as shown in FIG. 8. Rather, the problem (i.e., no transmission of the front LG or RG) is judged as being caused by breakdown of the front sensor 24, 26 when a predetermined time Tm elapses after the transmission of the front LG or RG is stopped. Thus, the severity determining unit 36 is brought into the fail-safe mode upon a lapse of the predetermined time Tm. By waiting for the predetermined time Tm before entering the fail-safe mode, the severity determining unit 36 is prevented from being brought into the fail-safe mode by mistake when the transmission of the front LG or RG is temporarily stopped due to noise, or any other reason.

Upon entering the fail-safe mode, the severity determining unit 36 determines which of the LOW map and the HIGH map is used, depending upon whether the velocity change amount VG detected at this time is higher or lower a reference value KTH similar to that of FIG. 6. The reference value KTH is predetermined for each vehicle based on data obtained in collision tests, virtual simulations, and the like.

As described above, even when a problem occurs to the front sensor 24 or 26, the severity determining system 20 operates in the fail-safe mode, and determines the collision severity with high accuracy according to the severity determination map as shown in FIG. 4, which map involves the floor G and velocity change amount VG. In particular, when the front sensor 24 or 26 breaks down or becomes inoperative because of a collision of the vehicle, one of the LOW map and HIGH map is appropriately selected, using the reference value KTH and the velocity change amount VG. Accordingly, as shown in FIG. 4, the severity determination is performed using the LOW map in the case of a high-speed offset collision (ODB) in which it is preferable to determine the severity as being HIGH. In the case of a low-speed head-on collision in which it is preferable to determine the severity as being LOW, on the other hand, the severity determination is performed using the HIGH map.

As described above, the severity determining system 20 of the embodiment as shown in FIG. 1 is used with the airbag device 50 as an occupant protection device. Hereinafter, the structure of the airbag device 50 will be briefly described. The airbag device 50 includes an airbag 52, two inflaters 54 that supply gas to the airbag 52, two firing devices 56 which fire a gas generating agent (not shown in FIG. 1), and two drive circuits 58 that supply electric current to the respective firing devices 56 to fire the gas generating agent in response to a severity determination signal from the microcomputer 40. With the two inflaters 54 thus provided, the airbag 52 can be rapidly deployed at a high power level when both of the inflaters 54 are actuated simultaneously, and can also be deployed at a low power level when the two inflaters 54 are actuated at different points of time. In this embodiment, the airbag 52 is deployed at a high power level when the severity determining system 20 determines the collision severity as HIGH, and is deployed at a low power level when the severity determining system 20 determines the collision severity as LOW. According to the embodiment of the invention, even upon occurrence of a problem that makes it impossible to detect a signal indicative of the front LG or RG from the front sensor 24 or 26, the severity determining system 20 operates in the fail-safe mode so as to enable deployment of the airbag device 50 that is favorable or advantageous to the occupant. Thus, the severity determining system 20 of the embodiment constantly achieves desired occupant protection with high reliability.

FIG. 9 shows a control routine for determining collision severity when the severity determining system 20 of the present embodiment operates in a failsafe mode, which is established when no signal is transmitted from the front sensor 24 and/or front sensor 26.

The severity determination routine of FIG. 9 is implemented by the microcomputer 40 as shown in FIG. 1. First, the problem detecting unit 34 determines in step S100 whether no signal indicative of the front LG or RG is transmitted from the front sensors 24, 26. If no signal transmission is detected in step S100, the problem detecting unit 34 then determines in step S102 whether the problem arises from a failure of the front sensor(s) 24, 26 or from breakdown of the front sensor(s) 24, 26, or the like, which is caused by the vehicle collision. If a failure of the front sensor(s) 24, 26 is determined in step S102, the HIGH map is used for determining collision severity in step S108, so that the severity is more likely to be determined as being LOW. After executing step S108, the routine of FIG. 9 is finished.

If no failure of the front sensors 24, 26 is detected in step S102, on the other hand, step S104 is executed, assuming that a vehicle collision has occurred, to determine whether the predetermined time Tm has elapsed since the front LG or RG became unable to be detected. When step S104 determines that the time Tm has elapsed, the vehicle is determined as being in a collision state, and step S106 is executed to determine whether the current velocity change amount VG of the vehicle is greater than the predetermined reference value KTH. If the velocity change amount VG is determined as being greater than the reference value KTH in step S106, the severity determination is performed in step S108 using the HIGH map so that the severity is more likely to be determined as LOW, and thereafter the routine is finished. Conversely, if the velocity change amount VG is determined as not greater than the reference value KTH in step S106, the severity determination is performed in step S110 using the LOW map so that the severity is likely to be determined as HIGH, and thereafter the routine is finished.

In the embodiment as described above, the microcomputer 40 is adapted to perform overall control of the severity determining system 20, including control in the fail-safe mode. The invention, however, is not limited to this arrangement. For example, an ECU (electronic control unit) may be provided at a certain position within the vehicle 10 as shown in FIG. 2, for regularly monitoring the operating states of the front sensors 24 and 26, as well as the engine, brake system and the like, so as to operate the severity determining system 20 in the fail-safe mode as described above upon occurrence of a problem. In this case, the microcomputer 40 may be constructed as a part of the ECU.

In the illustrated embodiment, the severity determining system 20 is applied to the airbag device 50 which is employed as the occupant protection device. However, the severity determining system of the invention may be applied to a seatbelt pretensioner system serving as an occupant protection device, which automatically takes up the seatbelt in the event of a collision. Further, the severity determining device 20 may be applied to both the airbag device and the seatbelt pretensioner system.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A collision severity determining system for determining severity of a collision of a vehicle, comprising:

a first deceleration detector disposed substantially in a central portion of a body of the vehicle so as to detect a vehicle deceleration in a longitudinal direction of the vehicle;

a second deceleration detector disposed in a front portion of the vehicle that is located ahead of the first deceleration detector, so as to detect a deceleration at the front portion in the longitudinal direction of the vehicle;

a velocity change amount calculating unit that calculates a velocity change amount of the vehicle by integrating the vehicle deceleration detected by the first deceleration detector with respect to time;

a severity determining unit storing two or more severity determination maps defined by the vehicle deceleration detected by the first deceleration detector and the velocity change amount, each of the severity determination maps representing a threshold pattern consisting of threshold values with which the vehicle deceleration is compared so as to determine severity of the collision of the vehicle; and a problem detecting unit that generates a problem detection signal that indicates that a problem has occurred to the vehicle, when detecting an absence of a signal indicative of the deceleration transmitted from the second deceleration detector, wherein the problem detection signal includes an indication of a type of problem determined by the problem detecting unit, and further wherein when receiving the problem detection signal from the problem detecting unit, the severity determining unit operates in a predetermined fail-safe mode for selecting an appropriate one of the two or more severity determination maps based on the type of problem indicated by the problem detecting unit, and determines severity of the collision of the vehicle, based on the selected severity determination map.

2. A severity determination system according to claim 1, wherein:

when receiving no problem detection signal from the problem detecting unit, the severity determining unit determines severity of the collision of the vehicle, by using one of the two or more severity determination maps that is selected based on the deceleration detected by the second deceleration detector.

3. A severity determination system according to claim 2, wherein the severity determining unit determines the severity as being at a low level when the vehicle deceleration is not greater than a corresponding threshold value on the threshold pattern of the selected severity determination map, and determines the severity as being at a high level when the vehicle deceleration is greater than a corresponding threshold value on the threshold pattern of the selected severity determination map.

4. A severity determination system according to claim 1, wherein the severity determining unit determines the severity as being at a low level when the vehicle deceleration is not greater than a corresponding threshold value on the threshold pattern of the selected severity determination map, and determines the severity as being at a high level when the vehicle deceleration is greater than a corresponding threshold value on the threshold pattern of the selected severity determination map.

5. A severity determination system according to claim 4, wherein the two or more severity determination maps comprises a high map representing a first threshold pattern, and a low map representing a second threshold pattern having threshold values that are lower than those of the first threshold pattern.

6. A severity determination system according to claim 5, wherein the predetermined fail-safe mode of the severity determining unit is established when a problem based on a failure of the second deceleration detector is detected, and wherein the severity determining unit makes a collision severity determination by using the low map in the case of the failure of the second deceleration detector.

7. A severity determination system according to claim 5, wherein the predetermined fail-safe mode of the severity determining unit is established when a problem based on a breakdown of the second deceleration detector or a peripheral portion thereof due to the vehicle collision is detected, and wherein the severity determining unit selects one of the low map and the high map based on the velocity change amount obtained upon a lapse of a predetermined time after transmission of the signal indicative of the deceleration is stopped, and makes a collision severity determination by using the selected one of the low map and the high map.

8. A severity determination system according to claim 7, wherein the severity determining unit selects the low map for use in severity determination when the velocity change amount obtained upon the lapse of the predetermined time is smaller than a predetermined reference value, and selects the high map when the velocity change amount is larger than the predetermined reference value.

9. An apparatus comprising:
an occupant protection device that protects an occupant of a vehicle against a collision, the occupant protection device having at least two power levels; and
a collision severity determining system that determine the severity of the collision of the vehicle, which comprises:
(a) a first deceleration detector disposed substantially in a central portion of a body of the vehicle so as to detect a vehicle deceleration in a longitudinal direction of the vehicle;
(b) a second deceleration detector disposed in a front portion of the vehicle that is located ahead of the first deceleration detector, so as to detect a deceleration at the front portion in the longitudinal direction of the vehicle;
(c) a velocity change amount calculating unit that calculates a velocity change amount of the vehicle by integrating the vehicle deceleration detected by the first deceleration detector with respect to time;
(d) a severity determining unit storing two or more severity determination maps defined by the vehicle deceleration detected by the first deceleration detector and the velocity change amount, each of the severity determination maps representing a threshold pattern consisting of threshold values with which the vehicle deceleration is compared so as to determine severity of the collision of the vehicle; and
(e) a problem detecting unit that generates a problem detection signal that indicates that a problem has occurred to the vehicle, when detecting an absence of a signal indicative of the deceleration transmitted from the second deceleration detector, wherein the problem detection signal includes an indication of a type of problem determined by the problem detecting unit, and further wherein
when receiving the problem detection signal from the problem detecting unit, the severity determining unit operates in a predetermined fail-safe mode for selecting an appropriate one of the two or more severity determination maps based on the type of problem indicated by the problem detecting unit, and determines severity of the collision of the vehicle, based on the selected severity determination map.

* * * * *